Feb. 16, 1960    N. RHOADES ET AL    2,924,928
POWER MOWER WITH ROTARY CUTTER
Filed Oct. 8, 1956    11 Sheets-Sheet 4

Fig. 5.

Inventors
Igor Kamlukin
Nolan Rhoades
Attorney

Inventors
Igor Kamlukin
Nolan Rhoades

Feb. 16, 1960     N. RHOADES ET AL     2,924,928
POWER MOWER WITH ROTARY CUTTER Filed Oct. 8, 1956     11 Sheets-Sheet 10

Fig. 13.

Inventors
Igor Kamlukin
Nolan Rhoades

United States Patent Office 2,924,928
Patented Feb. 16, 1960

2,924,928

POWER MOWER WITH ROTARY CUTTER

Nolan Rhoades, Beloit, and Igor Kamlukin, Milwaukee, Wis., assignors to Simplicity Manufacturing Company, Port Washington, Wis., a corporation of Wisconsin Application October 8, 1956, Serial No. 614,695

6 Claims. (Cl. 56—25.4)

This invention relates generally to power propelled lawn mowers and has more particular reference to a lawn cutting device which is designed particularly for mowing larger than average lawns.

Generally speaking, there are two types of power lawn mowers presently in widespread residential use. With one such type of mower the blade assembly only of the mower is driven from the power source, and the operator is required to furnish the propelling force for the mower. With the other type of mower both the wheels and the blade assembly are driven from the power source. With both types, however, the operator must walk along behind the mower and guide it, and while this is generally not objectionable for substantially small lawns it is highly fatiguing and in many cases out of the question for the mowing of larger than average lawns.

Consequently, there is a definite need for power driven lawn mowing equipment for use on larger than average lawns, especially in suburban residential areas where lawns frequently have an expanse of one or more acres.

Accordingly, it is the primary object of the invention to provide a power driven lawn mowing device which is especially suited for the mowing of larger than average lawns, and which, though relatively small and compact, has provision to seat an operator thereon so that the operator may ride about while mowing the lawn.

More specifically, it is an object of this invention to provide a small, lightweight lawn tractor which is constructed to readily accommodate a lawn mowing element in a substantially unobstructed implement receiving space between the front and rear wheels of the tractor and under the driver and longitudinal frame means of the tractor chassis, so as to achieve exceptional compactness in the lawn cutting device thus provided.

In this connection it is a further object of this invention to provide a small lawn tractor of the character described having its power source located above and rearwardly of the rear axle of the tractor, behind the driver's seat, whereby the driver is protected against the heat and exhaust fumes of the internal combustion engine which provides the power source.

A further object is to provide a lawn cutting device comprising a lawn mowing element and a small tractor which is designed to straddle the mowing element and wherein the element is tractively coupled to the front axle of the tractor and has its rotatable blade assembly drivingly connected with a clutch controlled power takeoff member driven from the power source of the tractor and located between the rear wheels of the tractor, forwardly of the rear axle.

Still another object of this invention resides in the provision of a small lawn tractor of the character described having a front axle with steerable front wheels on its ends, and which incorporates novel steering mechanism by which the front wheels are turned in one direction or the other as a consequence of lateral tilting of an upright manually operable joy stick type of control member mounted on the front portion of the tractor chassis and extending to a level above that of the driver's seat but forwardly of the seat so as to be readily accessible to the operator of the tractor.

Still another object of this invention resides in the provision of a small lawn tractor of the character described wherein the rear wheels are drivingly connected with the power source through a clutch device biased toward disengagement, and wherein engagement of the clutch device requires the operator of the tractor to shift the joy stick steering control member in a longitudinal direction, against the bias acting upon the clutch device. With this arrangement it will be apparent that a dead-man type of control is provided for the tractor, requiring the operator to exert a slight clutch engaging force on the joy stick steering control member in order to operate the tractor, and that disengagement of the clutch, with resulting disruption of the transmission of driving torque to the rear wheels, will occur automatically in the event the operator releases the steering control stick.

Another object of this invention resides in the provision of a small tractor of unusual versatility in that while it is designed particularly for use with lawn mowing attachments of either the rotary or reel types, provision is made for the attachment of a snow plow blade to the front of the tractor, and for the attachment of a wide variety of other accessories to the rear of the tractor to be pulled about thereby.

A further object of this invention resides in the provision of a lawn cutting device comprising a small lawn tractor and a rotary lawn mowing element behind and tractively coupled to the front axle of the tractor in a manner such that the front wheels of the tractor are employed as gage devices to prevent scalping of a lawn being cut as the front wheels travel over uneven ground, thus at all times assuring the desired operating space between the rotary blade assembly of the mowing element and the ground.

In this connection it is a more specific object of this invention to provide a lawn cutting device comprising a rotary lawn mowing element having a blade assembly which rotates about a vertical axis, and a small tractor constructed to straddle the mowing element and have the latter tractively coupled to its front axle, the front axle of the tractor being tiltable in opposite directions about a longitudinal axis medially of its ends, and the mowing element having a draft connection therewith which provides for up and down tilting motion of the mowing element relative to the front axle about a transverse axis adjacent to the axle, but which connection constrains the mowing element to partake of all tilting motion of the front axle about said longitudinal axis.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof, and in which.

Referring now more particularly to the accompanying drawings, in which like reference characters have been applied to like parts throughout the several views, the numeral 5 generally designates the short wheelbase chassis of the lawn tractor of this invention. The chassis comprises front and rear axles 6 and 7 respectively, steerable front wheels 8 on the opposite ends of the front axle, drive wheels 9 on the oposite ends of the rear axle, and a centrally disposed longitudinal frame 10 having its ends connected with the medial portions of the front and rear axles to at all times maintain the same normal to the longitudinal dimension of the chassis and spaced apart a distance sufficient to accommodate a rotary lawn mowing element 11 between the front and rear wheels.

One of the outstanding characteristics of the frame is that it is comprised of a single elongated tube 13. The front end of the tube is fixed in a swivel head 14 which in turn is mounted on the medial portion of the front axle 6, and the rear end of the tube is fixed to the bight portion 16 of a fork having spaced downwardly extending arms 17. The lower ends of the fork arms are fixed to a fork supporting sleeve 18 in which the rear axle 7 is rotatably journaled.

The swivel head 14 and the fork cooperate with one another to mount the frame tube 13 medially of the chassis but slanting upwardly toward the rear thereof, and with the tube at an elevation spaced well above a plane containing the axes of rotation of the front and rear wheels 8 and 9, respectively. Consequently, a substantially unobstructed implement receiving space is provided beneath the frame tube and between the front and rear wheels of the tractor in which either a rotary or a reel type lawn mowing element may be accommodated, to be tractively coupled to the front axle of the tractor.

The power source for the tractor comprises a prime mover, preferably an internal combustion engine, indicated at 20, mounted above and behind the rear axle 7 on an engine supporting platform 21 welded to the fork with the platform disposed at a level slightly above the level of the rear axle. As shown best in Figure 6 the engine supporting platform is a substantially inverted channel shaped member having its forward end portion received between and fixed to the fork arms 17, and having a rear end portion which extends rearwardly from the fork, in cantilever fashion to mount the engine 20. In addition to supporting the internal combustion engine the platform 21 also contributes to the support of a drawbar 22 having its forward portion hooked around and fixed to the mid portion of the fork supporting sleeve 18 and having its rearwardly projecting portion suspended from the engine platform by a hanger 23.

The engine is covered by a hood 24 large enough to accommodate clutch controlled transmission mechanism 25 through which driving torque may be transmitted to the rear wheels 9 from the engine. The hook is pivotally supported on the rear portion of the engine platform by a pair of opposite transversely aligned screws 26 secured in the sides of the hood and threaded into holes in the ends of a rod 27 fixed in upstanding brackets 28 on the rear end portion of the engine supporting platform 21. Hence the hood may be swung upwardly and rearwardly out of its normal position covering the engine and transmission mechanism, in a clockwise direction as viewed in Figure 1, to an open position at which access may be had to the engine and transmission mechanism for inspection, adjustment, and/or repairs thereto.

The tractor is further provided with a seat 29 for the driver, and it is a feature of this invention that the seat is located above and slightly forwardly of the rear wheels 9 so as to be ahead of the engine and directly over the rear portion of the implement receiving space between the front and rear wheels of the tractor. The seat 29 is mounted on the rear portion of the chassis by means of a pair of flat laterally spaced brackets 30 the rear portions of which are flatwise secured to the upper portions of the fork arms by screws 31 at the upper ends of the fork arms, and by bolts 31a and 31b at the medial portions of the fork arms, and the intermediate portions of the bracket are anchored to the frame tube by a bolt 32.

With the seat mounted in this location, that is, ahead of the power source, the driver of the tractor is not subjected to the heat or the fumes of the internal combustion engine, and his location above a rotary lawn mowing element 11 in the implement receiving space protects him against injury from flying stones impinged by the rotating blades of the mowing element during operation of the device. It will also be noted that since the tractor has a short wheel base, a driver occupying the seat 29 straddles the frame tube 13 and may rest his feet upon the front axle 6 at opposite sides of the swivel head 14.

Figure 10:
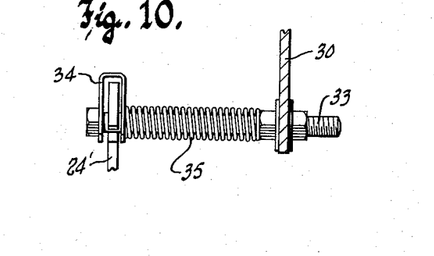
Figure 10 is a fragmentary view of the latch mechanism for the hood which covers the power source of the tractor, taken along the line 10—10 in Figure 2.

The seat brackets also have a pair of studs 33 fixed thereto and projecting outwardly therefrom on a common transverse axis, each carrying a U-shaped latch 34 at its outer end. These latches may be swung around the studs to operative positions engaging over the front ends of forwardly projecting arms 24' on the front of the hood 24 to releasably hold the hood in place covering the engine and transmission 25. The engagement of the under edges of the arms 24' with the studs 33, of course, defines the normal position of the hood, and the latches are frictionally held in an operative position shown in Figure 10 preventing the hood arms from lifting off the studs 33, by means of coiled compression springs 35 encircling the studs and confined axially between each latch and the adjacent seat bracket 30.

According to this invention the front axle 6 is comprised of a transverse shaft having an upstanding bearing bracket 36 rigidly secured to each extremity thereof, as by welding. Each of these bearing brackets is provided with spaced apart horizontal flanges 37 having vertically aligning holes 38 therein to rotatively receive the upright leg 39 of an L-shaped spindle 40, the horizontally disposed leg 41 of which projects outwardly and has one of the front wheels 8 freely rotatably journaled thereon. The brackets 36 and the spindle 40, therefore, provide steering knuckles for the front wheels by which they may be turned about the vertical axes of the upright legs 39 of the spindles to control the direction of travel of the tractor.

As will be described in more detail shortly, steering mechanism 43 is provided to enable the front wheels 8 to be turned in unison by the driver of the tractor so that he may readily control its direction of travel.

The opposite end portions of the front axle 6 are supported by the front wheels 8 as is customary, but in the present case this is effected in an exceedingly simple manner by having the lower flanges 37 of the bearing brackets on the ends of the axle rest upon the forward end portions of steering arms 44 which are fixed to the upright legs 39 of the spindles. Pins 45 secured in the upper ends of the upright legs of the spindles, above the upper flanges 37, thus cooperate with the forward ends of the steering arms in holding the ends of the front axle against up and down motion relative to the front wheels.

As indicated previously, the front end portion of the frame tube 13 is connected with the mid portion of the front axle 6 by means of a swivel head 14. As shown best in Figure 3 the swivel head is comprised of complementary laterally adjacent hollow housing sections 47 which are clamped around the front end portion of the frame tube by bolts 48 extending through both sections as well as the frame tube, so that the swivel head is rigidly attached to the tube and becomes a part of the frame.

The connection between the swivel head and the mid portion of the front axle 6 is designed to provide for a limited degree of tilting motion of the front axle about a longitudinal axis medially of its ends, and relative to the frame. For this purpose the axle has a substantially U-shaped bracket 50 fixed to its mid portion, as by welding, with its upstanding arms 51 spaced forwardly and rearwardly of the axle and projecting into the open underside of the swivel head. These arms have longitudinally aligning holes therein to freely rotatably receive a hinge pin 52. The hinge pin is so supported by the bracket 50 as to be disposed on a horizontal axis, and it extends over the front axle and beyond the arms 51 of the bracket to have its opposite end portions clampingly embraced by the lower edge portions of the complementary housing sections 47 of the swivel head.

Figures 3, 4:
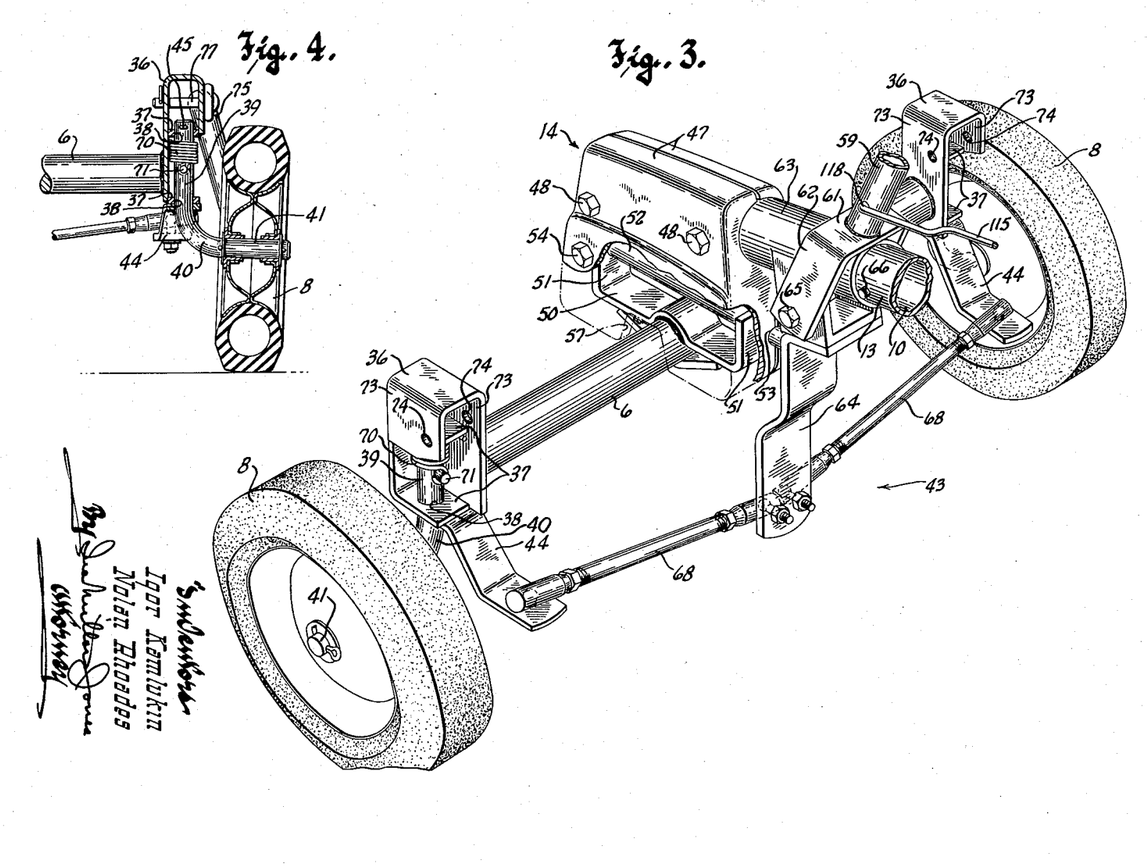
Figure 3 is an enlarged perspective view of the front end portion of the tractor chassis.
Figure 4 is a detail sectional view through one of the front wheels of the tractor taken along the plane of the line 4—4 in Figure 1.

As seen best in Figure 3, the projecting end portions of the hinge pins are received in notches 53 in the end walls of the housing sections, and a second pair of bolts 54 is preferably provided to hold the housing sections 47 clamped tightly onto the hinge pin. Longitudinal motion of the front end of the frame relative to the axle may be prevented in any suitable manner, for instance by so spacing the upright arms 51 with respect to the fore and aft end walls of the swivel head housing as to constrain the front axle to tilting motion only about the hinge pin.

Tilting motion of the front axle in opposite directions about the hinge pin 52 is both provided for and limited by means of notches 57 in the lower edge portions of the side walls of the swivel head. These notches are directly over the front axle and thus enable it to tilt an extent determined by engagement of the axle with the bottoms of the notches. It is also important to note that the tilt axis for the front axle is above the axle, between it and the front end portion of the frame tube 13.

Figure 1:
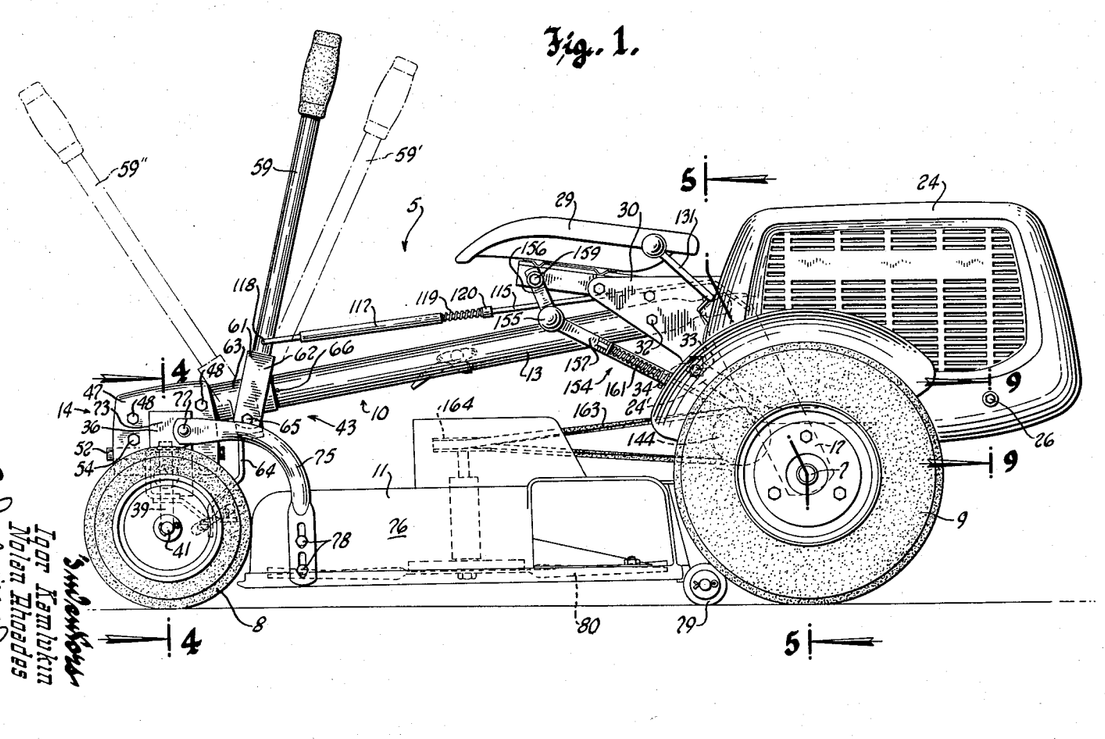
Figure 1 is a side elevational view of the tractor of this invention shown with a rotary lawn mower attached thereto.
Figure 2:
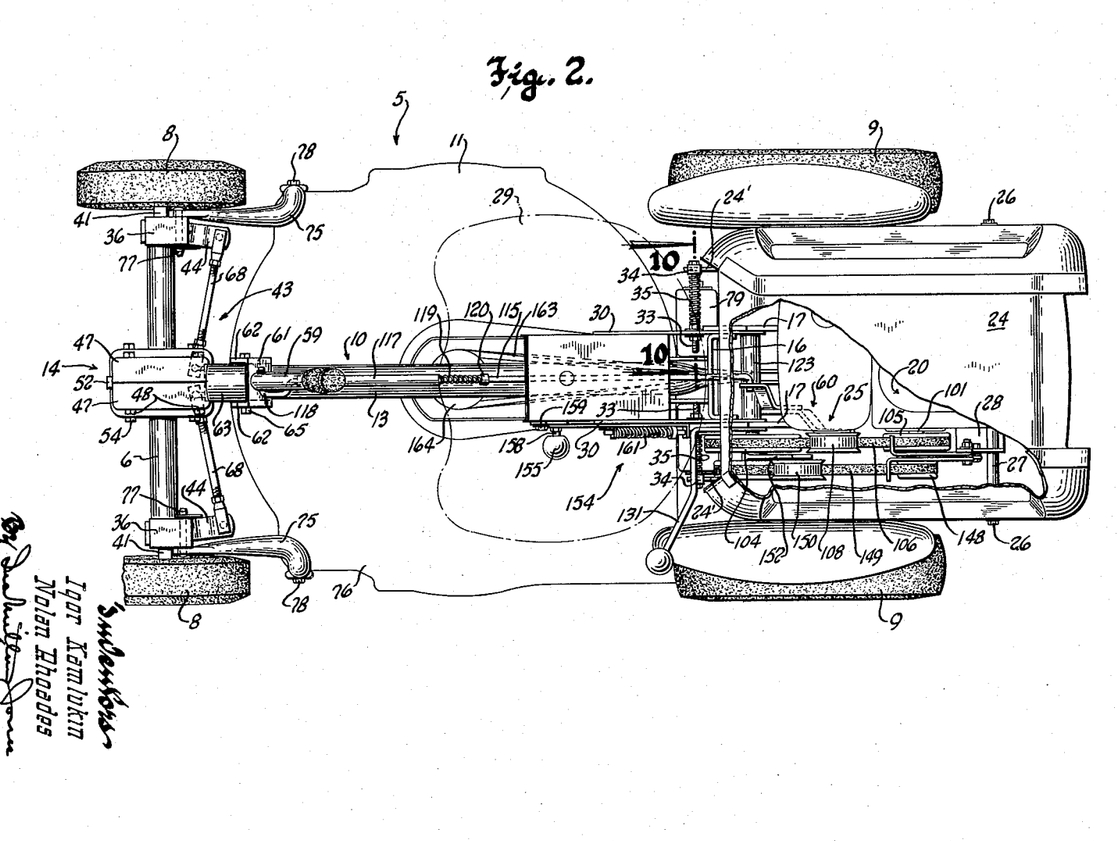
Figure 2 is a plan view of the tractor-mower combination shown in Figure 1.

Referring to Figure 1, it will be noted that the swivel head 14 cooperates with the fork on the rear of the frame tube to dispose the tube at an elevation a substantial distance above a plane containing the axes of rotation of the front and rear wheels and with the rear of the frame tube slanting upwardly and rearwardly so as to be located as high as possible under the seat.

The steering mechanism 43 comprises an upright joy stick type of manually operable control member 59 supported by the front end portion of the frame tube 13 for both lateral and fore and aft rocking motion. The side to side rocking of the control stick 59 is translated into steering motion of the front wheels through the rearwardly projecting steering arms 44, while the fore and aft rocking motion of the control stick is employed to effect engagement and disengagement of a clutch device 60 by which the transmission of driving torque from the internal combustion engine to the rear wheels may be governed.

In order to provide for such lateral and longitudinal rocking motion of the steering control stick, its lower end is fixed to the bight portion of a clevis 61 having downwardly projecting arms 62 which straddle the frame tube 13 rearwardly of the swivel head 14 and loosely embrace a sleeve 63 freely rotatably journaled on the bearing provided by the front portion of the frame tube. The sleeve 63 comprises the hub of a downwardly extending lever 64 to which the clevis arms 62 are pivotally secured by a cross bolt 65.

The bolt 65 thus supports the lower end portion of the steering control stick 59 for fore and aft rocking motion about a transverse axis slightly beneath the front end portion of the frame tube, while the sleeve 63, to which the lever 64 is attached, provides for transverse rocking of the steering control stick about the longitudinal axis of the frame tube itself. Sliding motion of the sleeve 63 lengthwise along the frame tube is precluded by its confinement between the rear of the swivel head 14 and a pin 66 fixed in the side of the frame tube.

The lower end of the lever 64 is disposed substantially medially between the rear ends of the steering arms 44, and it is connected with them by means of a pair of steering links 68 having ball and socket connections at their opposite ends with the arms and the lever.

Since the steering control stick 59 extends upwardly above the level of the driver's seat and is located forwardly thereof, it is readily accessible to the driver of the tractor. Lateral rocking of the stick in opposite directions, of course, will be translated through the steering links and arms into simultaneous pivotal motion of the front wheels in one direction or the other about the vertical legs of their spindles, so as to readily control the direction of travel of the tractor.

In order to facilitate steering and aid in maintaining a straight-away condition of the front wheels, a pair of torsion type centering springs 70 is provided. As shown best in Figures 3 and 4, each of the torsion springs 70 encircles the upright leg 39 of one of the wheel spindles and has one end thereof reacting against the bearing bracket 36 and its other end hooked about a pin 71 fixed in the side of the spindle.

The torsion springs are so arranged, however, as to tend to turn the front wheels simultaneously in opposite directions. As an example, it may be assumed that the springs tend to turn the wheels to bring their front portions inwardly, toward one another, so that one of the torsion springs will always assist the operator when making a turn, while the other spring opposes the turn. While both springs cooperate with one another and with the steering links and arms to tend to hold the wheels in line with the rear wheels, their primary function is to facilitate initial returning motion of the wheels toward straight-away, after a sharp turn has been negotiated.

The bearing brackets 36 on the opposite ends of the front axle 6 also provide anchors to which an implement such as a lawn mowing element 11 of either the rotary or reel type may be tractively coupled. For this purpose each of the bearing brackets is provided with upright laterally spaced flanges 73 having transversely aligning holes 74 therein, the holes in the two brackets being coaxial. Upwardly and forwardly extending arms 75 having their lower ends secured to the opposite sides of the housing 76 of the rotary lawn mowing element 11, provide for tractively coupling the mowing element to the brackets 36. The forward end portions of these arms overlie the outer flanges 73 of the bearing brackets and are pivotally secured thereto by means of pins 77 received in each pair of holes 74 in the brackets.

The arms 75 are rigidly but vertically adjustably secured to the housing 76 of the mowing element by screws 78, and their pivotal connections with the bearing brackets thus cooperate with transversely coaxial ground engaging rollers 79 on the rear of the housing to support the mowing element with its horizontally rotating blades 80 spaced a definite distance above the ground. The pivot pins 77, of course, mount the mowing element on the front axle for up and down tilting motion about the transverse axis of the pins 77. This is an important feature of the invention, since it allows the mowing of grass in depressions as the tractor is driven along a lawn.

Even more important is the fact that the connection of the arms 75 with the bearing brackets 36 constrains the mowing element to partake of all of the tilting motion of the front axle about the hinge pin 52 as either of the front wheels rides up and down over uneven ground. Since the mowing element tilts with the front axle in the manner described there is little or no danger of scalping the lawn as would otherwise result if the mowing element was not lifted simultaneously with one or the other of the front wheels as it rode up onto an area of the lawn higher than that engaged by the opposite front wheel.

Figure 11:
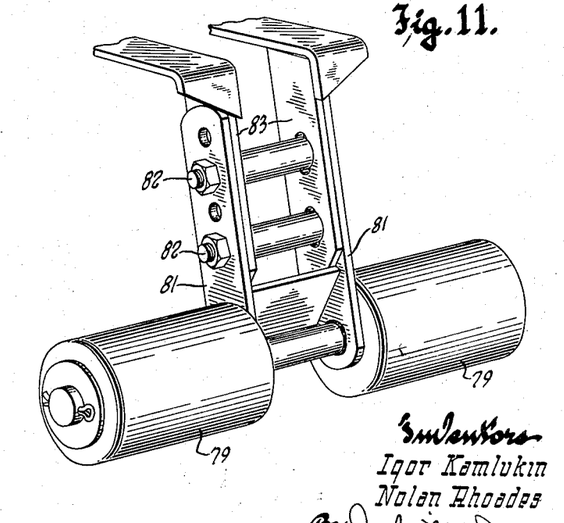
Figure 11 is a fragmentary perspective view illustrating the adjustable rear roller assembly for the rotary lawn mower shown in Figure 1.

The rollers 79, which have sufficient combined length to prevent dragging of the housing 76 on the ground during tilting of the mowing element with the front axle, are also mounted on the rear of the housing of the mowing element for vertical adjustment, as shown in Figure 11. As therein seen the rollers are mounted on a common transverse shaft having its medial portion received in spaced upstanding hangers 81 joined together near their lower ends by a cross bar. Bolts 82 selectively receivable in aligning sets of holes in the hangers and in the downwardly extending legs 83 of a bracket on the rear of the mower housing enable the rollers to be set at any of a number of different elevations with respect to the plane of the cutting blades 80.

Figure 5:
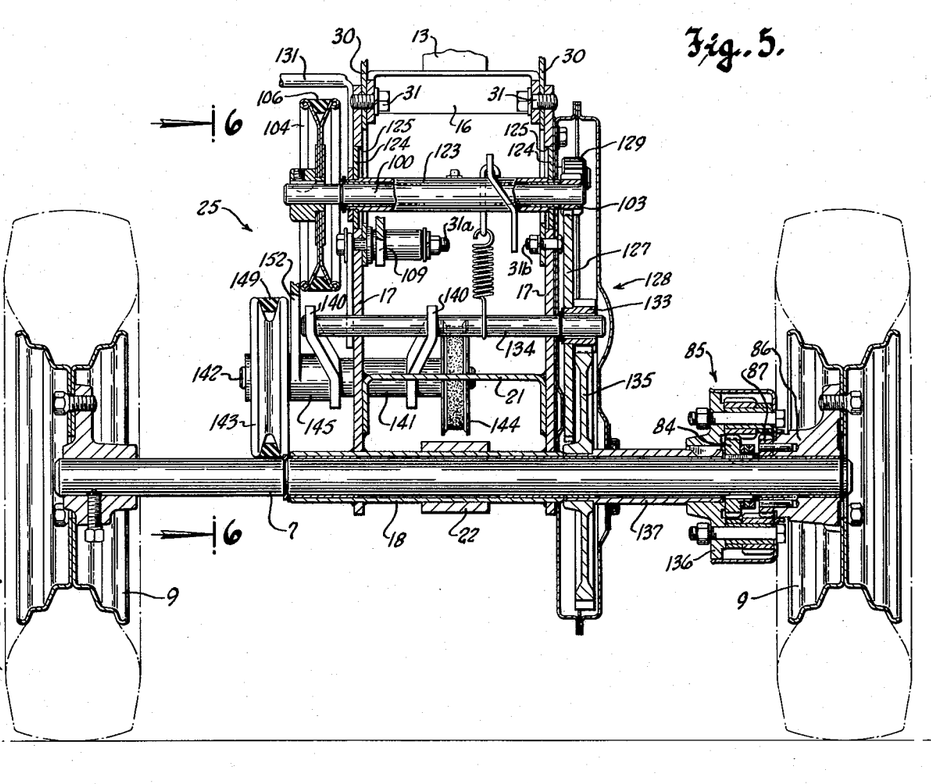
Figure 5 is a vertical sectional view through the rear axle of the tractor, taken along line 5—5 in Figure 1.

Referring now to the rear axle, as seen best in Figure 5, it will be noted that the hub of the left rear wheel 9 is fixed directly to one end portion of the shaft which comprises the axle, and is at all times drivingly connected with one of the drive gears 84 of a spur gear differential 85 located on the axle near its opposite end. The hub of the right rear wheel is fixed to a sleeve 86 freely rotatably encircling the adjacent end portion of the shaft and has the other drive gear 87 of the differential fixed directly thereto. The differential, of course, enables driving torque to be transmitted to either or both rear wheels and permits either wheel to rotate at a greater rate than the other when the tractor is negotiating a turn.

The transmission mechanism 25, by which the rear wheels are drivingly connectable with the engine 20, is mounted on the frame fork at the rear of the chassis so as to be located over the rear axle and between the rear wheels. The transmission mechanism is shown best in Figures 6, 7 and 8 and comprises a main drive shaft 100 extending transversely through the fork arms and rotatable on a horizontal axis spaced forwardly of and almost at the same level as the engine crankshaft 101. At its end nearest the differential 85, the main drive shaft has a drive pinion 103 fixed thereon, and a grooved pulley 104 fixed on the opposite end of the shaft, substantially in longitudinal alignment with a similar pulley 105 on the crankshaft is drivingly connectable with the latter by means of a V belt 106. The belt 106 normally quite loosely engages around the pulleys 104 and 105 so as to preclude the transmission of driving torque from the engine to the main drive shaft except when the belt is tightened into driving engagement with these pulleys. The clutch mechanism 60 mentioned hereinbefore is provided for that purpose.

Figure 6:
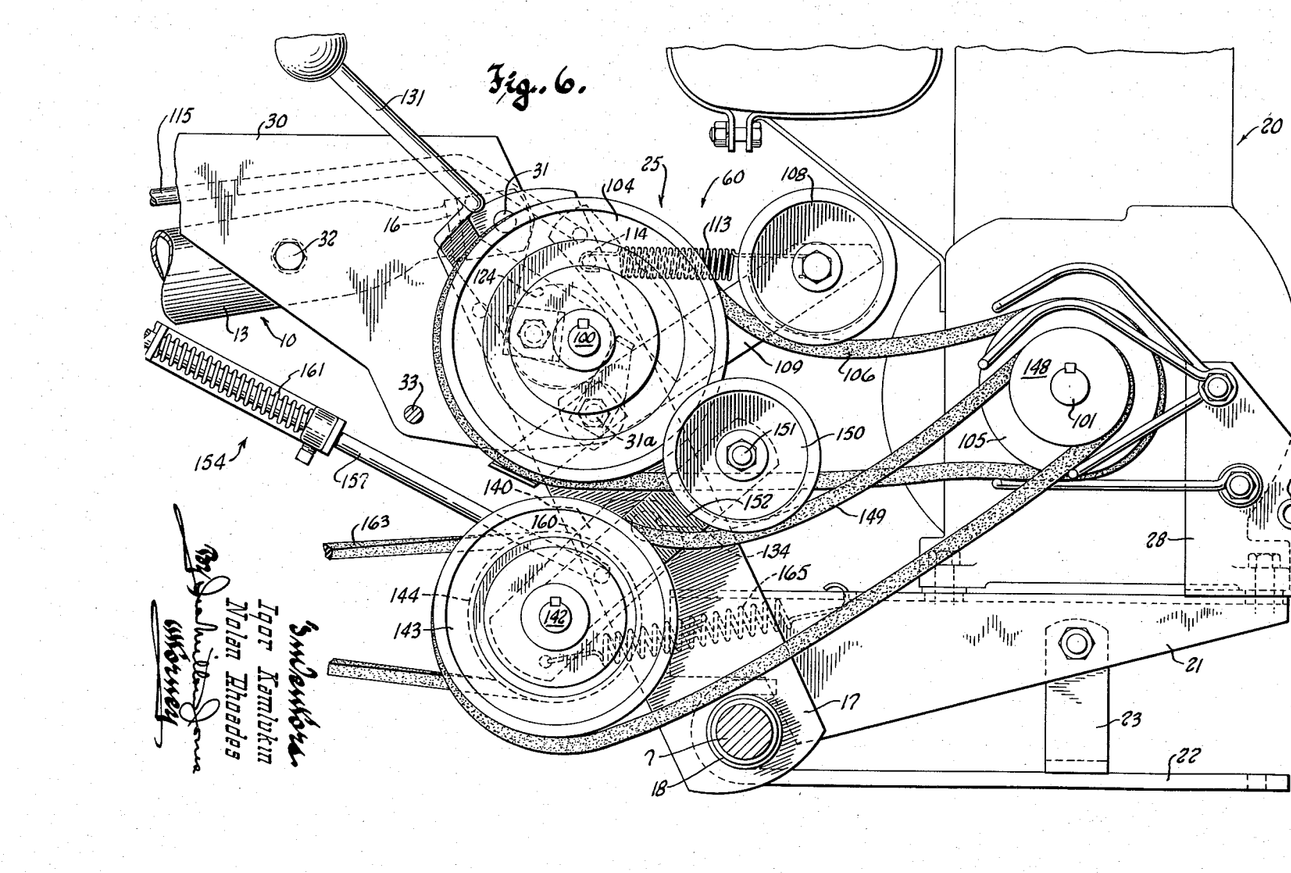
Figure 6 is an enlarged cross-sectional view through the rear axle taken along the plane of the line 6—6 in Figure 5.
Figure 7:
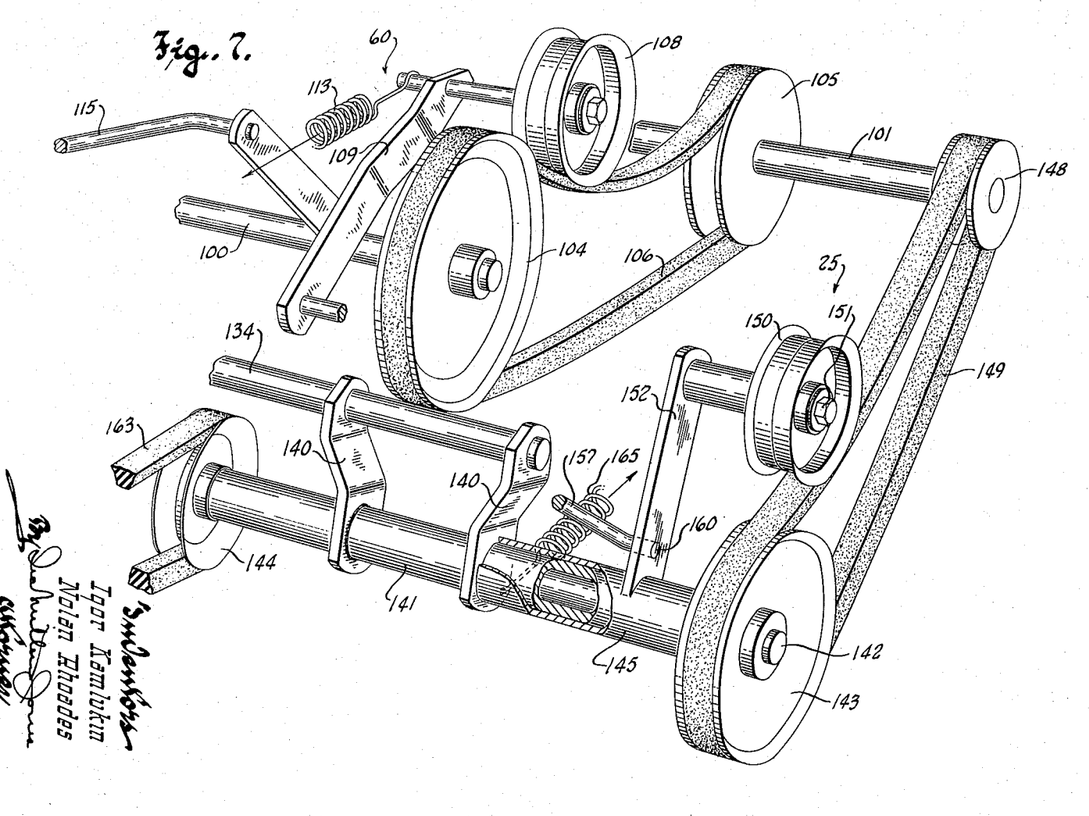
Figure 7 is an enlarged more or less diagrammatic perspective view of the transmission and clutch mechanism shown in Figure 6.

The clutch mechanism comprises a grooved pulley 108 freely rotatably mounted on an arm 109 to track upon the upper stretch of the belt 106 and the arm 109, in turn, is pivotally mounted on the lower bolt 31a which connects the adjacent seat bracket to the frame fork. As seen in Figure 6, therefore, the clutch pulley 108 may be swung bodily toward and from the upper stretch of the belt 106, about a transverse axis which is located close to and nearly directly below the axis of the main drive shaft 100.

A coiled tension spring 113 having its rear end connected to the free end portion of the arm 109 and its forward end anchored to the frame fork as at 114 (Figure 6) at all times exerts a force upon the arm tending to swing the latter in a counterclockwise or clutch disengaging direction, as viewed in Figure 6. The clutch mechanism 60 is shown disengaged in Figure 6, and the driving connection between the engine crankshaft and the main drive shaft 100 accordingly is disrupted.

It is one of the features of this invention that the clutch mechanism 60 is operated by a link 115 which connects the pulley arm 109 with the joy stick steering control member 59. Hence, the clutch will be engaged to drivingly connect the engine with the main drive shaft only so long as the operator holds the steering control member tilted rearwardly to a position such as indicated by construction lines at 59' in Figure 1.

It is another feature of this invention, however, that the rearward thrust of the steering control element 59 necessary to tighten the belt 106 about the pulleys 104 and 105 is impositively transmitted to the arm 109 which carries the clutch pulley 108. Referring to Figure 1, it will be noted that a substantial length of the forward end portion of the link 115 is endwise slidably received in a sleeve 117 which in turn is connected with the lower end portion of the steering control stick 59 as at 118, and that a compression spring 119 encircling the link is confined between the rear end of the sleeve 117 and a shoulder 120 on the link. Consequently, all of the rearward thrust necessary to engage the clutch for the establishment of the driving connection between the engine and the main drive shaft 100 must be transmitted to the link through the compression spring 119. The front end portion of the link 115, however, extends far enough inside the sleeve 117 as to readily permit the steering control stick 59 to be swung forwardly to the position indicated in construction lines at 59" in Figure 1, without pulling out of the sleeve. In its extreme forward position, the stick may be used as a handle by an operator to facilitate pulling the tractor about manually during storing of the tractor and/or removing it from storage.

Figure 8:
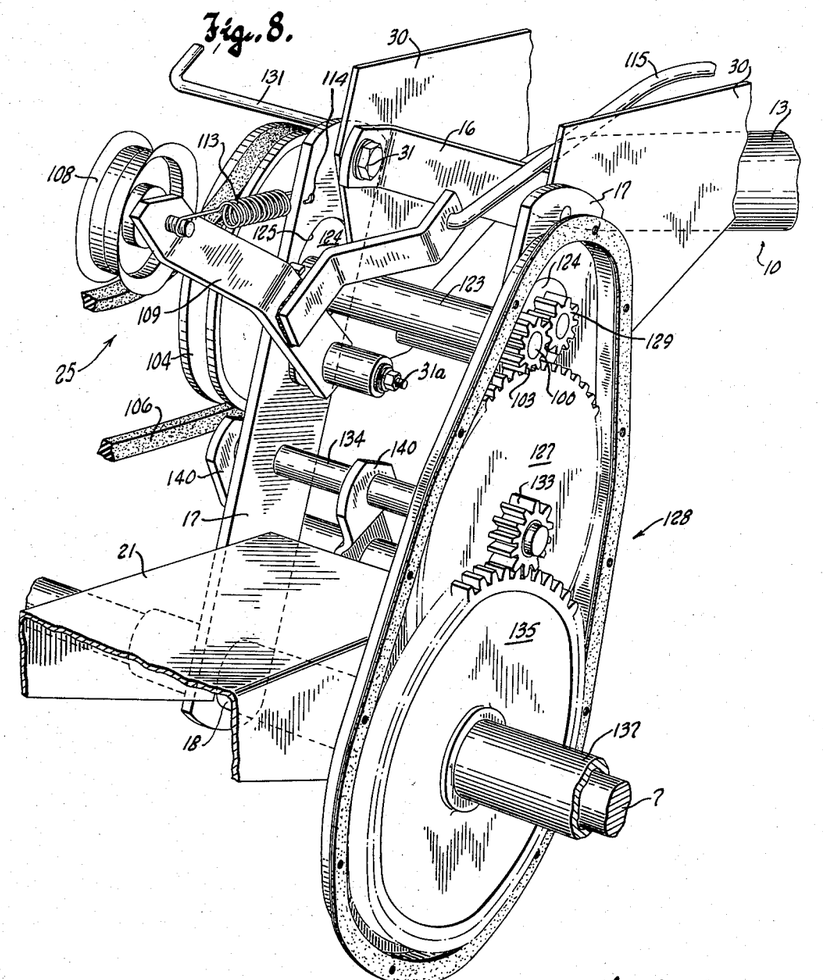
Figure 8 is a fragmentary perspective view on an enlarged scale illustrating details of the tractor clutch and reversing mechanism.
Figure 9:
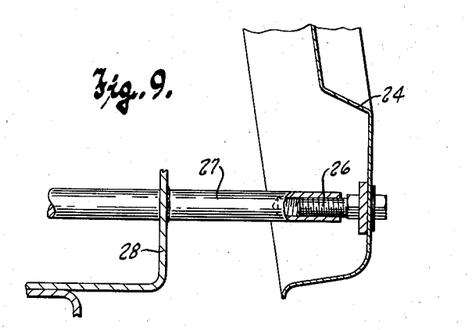
Figure 9 is an enlarged fragmentary sectional view taken on the plane of the line 9—9 in Figure 1.

As seen best in Figures 5 and 8 the main drive shaft 100 is freely rotatably journaled in a sleeve 123 each end portion of which is eccentrically secured in a disc 124. The discs 124, in turn, are freely rotatably received in holes 125 in the fork arms 17 so that when the discs are simultaneously rotated in the same direction the main drive shaft will be rocked bodily up or down about an axis spaced slightly forward thereof but parallel to the shaft. Such bodily rocking motion of the main drive shaft is relied upon to effect engagement and disengagement of the pinion 103 thereon with a large diameter gear 127 forming part of transmission gearing 128.

As shown in Figure 8 the disc 124 adjacent to the drive pinion 103 also has a second pinion 129 freely rotatably but eccentrically journaled thereon at the side of the pinion 103 remote from the engine crankshaft. The pinion 129 is at all times in mesh with the pinion 103 but it is spaced from the transmission gear 127 in the positions of the parts shown in Figures 5, 6 and 8 wherein the transmission is set for "forward" operation of the tractor. When the two discs 124 are rotated simultaneously in a clockwise direction as seen in Figure 8, however, the forward pinion 103 is disengaged from the transmission gear 127 and the reversing pinion 129 is brought into mesh with the transmission gear 127 to effect "reverse" travel of the tractor.

The sleeve 123 on the main drive shaft, and upon which the discs are mounted, serves to connect the discs for rotation in unison, and such rotation may be imparted to the discs by means of an upwardly and forwardly projecting gear shift lever 131 fixed to the sleeve and having a knob on its outer end disposed directly alongside the rear portion of the operator's seat 29 so as to be readily accessible to the driver of the tractor. Referring to Figure 6 therefore, the hand lever is shown in its upward limit of motion at which it holds the main drive shaft in a lowermost position with its "forward" drive pinion 103 in mesh with the transmission gear 127. The operator of the tractor need merely push downwardly upon the hand lever to impart clockwise motion (as viewed in Figure 8) to the discs 124 in order to lift the main drive shaft and establish the "reverse" drive for the tractor.

As will be apparent from a consideration of Figure 5 the transmission gear 127 is fixed on the hub of an intermediate pinion 133 which is freely rotatably received on the end portion of a supporting shaft 134 extending transversely through and carried by the fork arms. The pinion 133 in turn meshes with a second large diameter transmission gear 135 which may be considered a part of the differential gearing, inasmuch as it is at all times drivingly connected with the end plate 136 of the differential housing through a sleeve 137 to which both are fixed. The sleeve 137, of course, is freely rotatably received on the shaft 7 of the rear axle.

The supporting shaft 134 is mounted on the fork arms with its axis substantially medially between and parallel to the axes of the rear axle 7 and the main drive shaft 100. A pair of transversely spaced arms 140, having one end rockably mounted on the supporting shaft and their opposite ends fixed to the exterior of a tube 141 swingably supports a power take-off shaft 142 with the latter freely rotatably journaled in the tube for rotation on an axis parallel to but slightly below and forwardly of the shaft 134, ahead of the frame fork, and at a level substantially corresponding to that of the axis of the hinge pin 52 on the swivel head 14. The arms 140, of course, mount the power take-off shaft for swinging motion, bodily, about the axis of the supporting shaft 134. The power take-off shaft projects a short distance from each end of the tube 141, and at one end it has a V groove input pulley 143 fixed thereto, while a V groove output pulley 144 is fixed to its opposite end portion and so located as to be substantially in the median vertical plane of the tractor chassis.

The input pulley 143 on the power take-off shaft is located substantially in longitudinal alignment with and ahead of a second V groove pulley 148 on the crankshaft of the engine and is drivingly connectable therewith by a V belt 149. The belt 149 normally quite loosely encircles the pulleys 143 and 148 but can be tightened into driving relationship therewith by means of a belt tightener or clutch pulley 150 arranged to track on the upper stretch of the belt and freely rotatably journaled on a stud 151 anchored in the upper rear portion of an arm 152 having its other end fixed to a sleeve 145 loosely encircling the tube 141 and confined endwise between the hub of the input pulley 143 and the adjacent arm 140. Thus, it will be apparent that the power take-off shaft will be drivingly connected with the engine pulley 148 whenever the clutch pulley 150 is swung downwardly onto the belt 149 to tighten the same. If the clutch pulley is swung upwardly in a counterclockwise direction, to its position shown in Figure 6, the driving connection between the engine pulley 148 and the input pulley 143 on the power take-off shaft is disrupted by the resulting loosening of the belt 149.

Such back and forth swinging motion is imparted to the clutch pulley 150 in order to either establish or disrupt the driving connection between the power take-off shaft and the engine crankshaft by means of a manually operable overcenter type shift mechanism 154 having a knob 155 disposed alongside but below the driver's seat so as to be readily accessible to the driver. As seen best in Figure 1, this shift mechanism comprises a pair of upper and lower links 156 and 157, respectively, pivotally connected at one end thereof to a stud 158 carried by the knob 155. The opposite end of the shorter upper link 156 is pivotally mounted as at 159 on a forward extension of one of the seat brackets 30, while the remote end of the link 157 is pivotally connected as at 160 to the arm 152 which carries the clutch pulley 150. The link 157 comprises two endwise arranged and relatively movable link sections having a compression spring 161 confined therebetween and tending to lengthen the link, whereby the knee (knob stud 158) of the toggle linkage formed by the links 156 and 157 is maintained at one side or the other of a straight line joining the pivot axes of the remote ends of the links.

With the toggle shift mechanism 154 in its position seen in Figure 1, therefore, the clutch provided by the pulley 150 is disengaged to prevent the power take-off shaft from rotating with the engine crankshaft. In order to drivingly connect the power take-off shaft with the engine, the operator merely pulls upwardly and rearwardly on the knob 155 to snap the toggle linkage past dead center and at the same time cause the arm 152 of the clutch pulley to swing about the tube 141 supporting the power take-off shaft, in a clockwise direction as seen in Figure 6, and thereby carry the pulley 150 down onto the belt 149 to tighten the same around the pulleys 143 and 148. The downward and rearward thrust which the toggle linkage exerts on the arm 152 of the clutch pulley is also imposed on the power take-off shaft itself causing the latter to rock slightly in the counterclockwise direction, as viewed in Figure 6, about the axis of its supporting shaft 134, to thus tighten a belt 163 connecting the output pulley 144 with a cooperating pulley 164 on the blade assembly of the lawn mowing element 11.

A tension spring 165 connected between the engine supporting platform 21 and the lower end of one of the arms 140 at a point below the power take-off shaft, tends at all times to swing the power take-off shaft in the counterclockwise direction about the axis of its supporting shaft 134, and thus cooperates with the spring 161 of the shift mechanism 154 to hold the belt 163 tight in the engaged position of the clutch pulley 150.

Attention is directed to the fact that the output pulley 144 on the power take-off shaft is located midway between the rear wheels of the tractor, and in approximate alignment with the axis of the hinge pin 52 on the swivel head. This disposition of the output pulley minimizes misalignment between it and the pulley 164 on the shaft of the mowing element 11 due to tilting of the mowing element with the front axle. In this respect, it should be noted that the pulley 164 on the mowing element is also in approximate alignment with the axis of the hinge pin 52.

Figure 12:
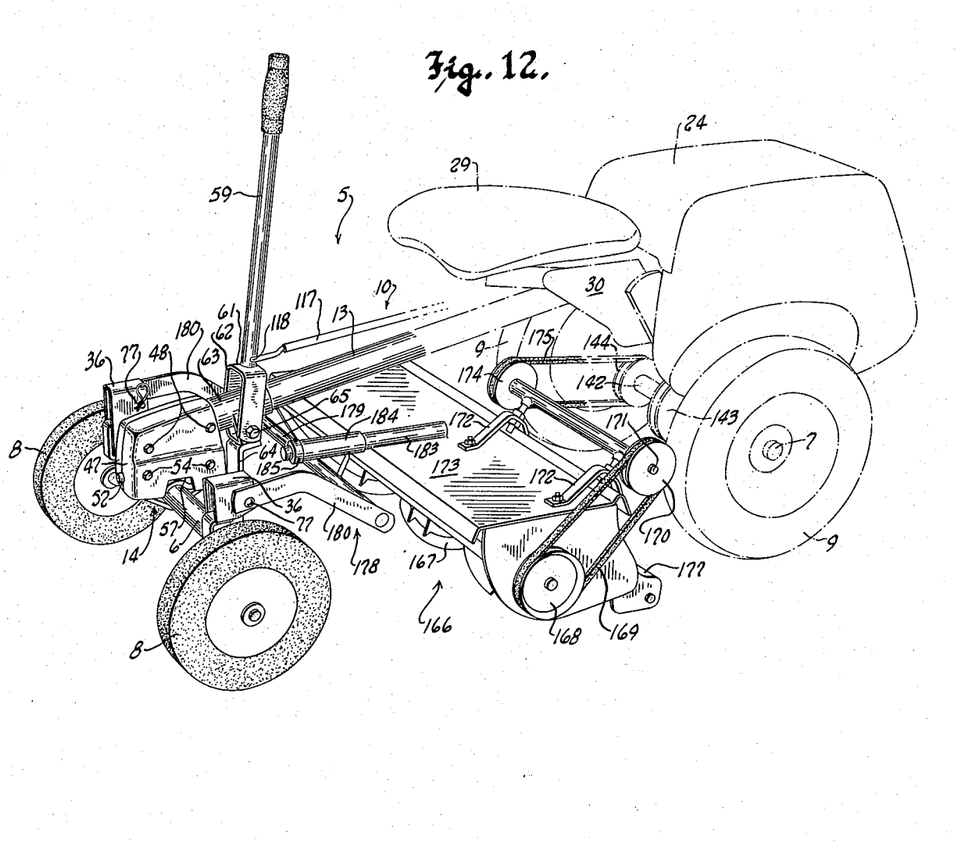
Figure 12 is a perspective view of the tractor of this invention having a reel type lawn mower tractively coupled to its front axle.

If desired, a mowing element 166 of the reel type may be tractively coupled to the bearing brackets on the ends of the front axle, with the tractor also lengthwise straddling the mowing element in the manner shown in Figure 12. In this case, however, the horizontally rotatable reel 167 of the mower carries a grooved pulley 168 which is connected by a V belt 169 with a cooperating pulley 170 carried by a transverse shaft 171 supported by brackets 172 at the upper rear of the cover-like housing 173 of the mowing element. The shaft 171 is disposed parallel to the reel 167 and has a second V groove pulley 174 thereon disposed longitudinally opposite the output pulley 144, to be connected therewith by a V belt 175.

While the reel type mowing element shown in Figure 12 likewise has a ground engaging roller 177 at its rear, it is tractively coupled to the front axle in a manner slightly different than that heretofore described with relation to the rotary mowing element 11. In this case a substantially U-shaped coupling device 178 connects the housing of the mowing element with the front axle brackets. The bight portion 179 of the coupling device extends transversely adjacent to the front of the mowing element while the opposite arms 180 thereof extend forwardly to have their extremities pivotally connected to the brackets 36 on the opposite ends of the axle by the same pins 77 used in connecting the rotary element to the tractor. The pins 77, of course, provide for up and down tilting motion of the reel type mowing element about a transverse axis adjacent to the front axle.

In addition, the mowing element 166 is also connected to the coupling device in a manner providing for tilting motion of the mowing element about a longitudinal axis passing centrally between the wheels of the tractor. For this purpose a stub shaft 183 fixed to the cover 173 of the mowing element has a reduced end portion which extends forwardly therefrom, medially of the ends of the element, to rotatably receive a sleeve 184 medially fixed to the bight portion 179 of the coupling device. The sleeve 184 is endwise confined between the forwardly facing shoulder on the stub shaft at the inner end of its reduced portion, and a collar 185 fixed on the forward extremity of the stub shaft.

The connection between the bight portion 179 of the coupling device and the stub shaft 183 thus constrains the mowing element to tilting motion about the axis of the stub shaft and to follow along with the tractor during the mowing of a lawn. In other words, with the arrangement described, the reel type mower may tilt independently of the front axle during travel of the tractor over rough or uneven ground.

Figure 13:
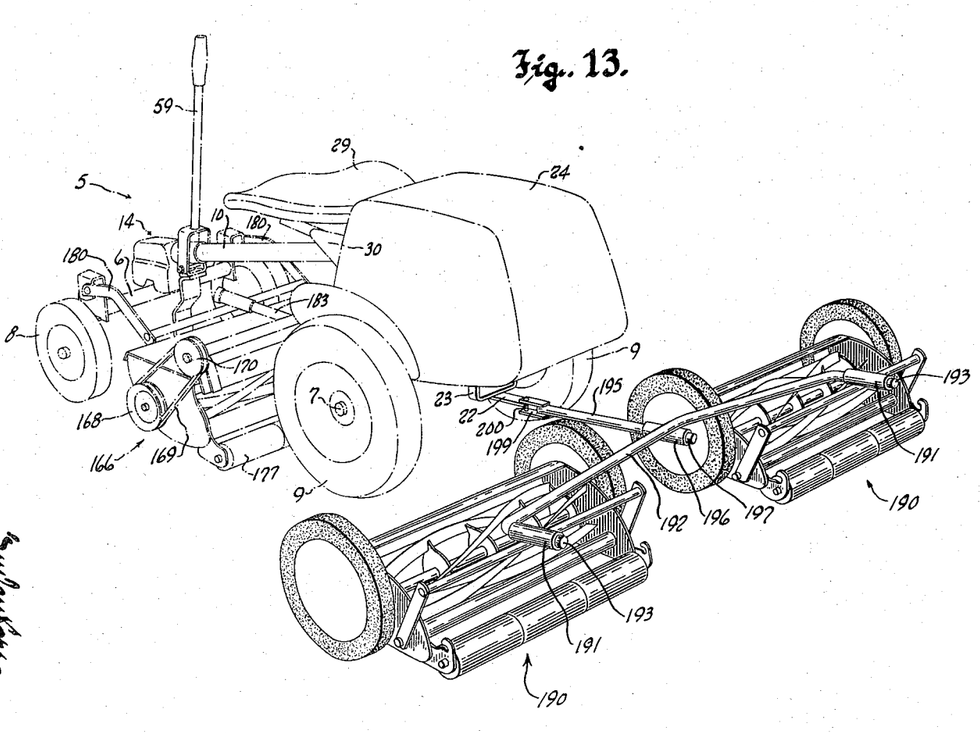
Figure 13 is a perspective view of the tractor-mower combination seen in Figure 12, but illustrating how a pair of transversely opposite and spaced apart trailing mowers may be connected to the rear of the tractor to cooperate with the mower coupled to its front axle in cutting a relatively wide swath.

Figure 13 illustrates how a pair of trailing reel type mowing elements 190 may be hitched to the rear of the tractor to be pulled thereby with the mowing elements transversely aligned and each disposed outwardly of one of the rear wheels 9 of the tractor. In this case the frames of the trailing mowing elements have sleeves 191 fixed thereto on spaced parallel longitudinally extending axes midway between the wheels of the elements, to freely rotate about the rearwardly bent ends of a transverse bridging member 192. Shoulders or collars 193 on the rear extremities of the bent ends of the bridging member engage the rear extremities of the sleeves and prevent displacement thereof from the bridging member, so as to thus constrain each of the trailing elements to swiveling motion about a longitudinal axis.

At a location midway of its ends the bridging member 192 has the rear end portion of a tongue 195 connected thereto in a manner providing for swiveling motion of the bridging member about a longitudinal axis. For this purpose the tongue 195 preferably has a reduced diameter rear end portion which is rotatively received within a sleeve 196 fixed to the mid portion of the bridging member, the sleeve being confined between the rearwardly facing shoulder defined by the junction of the tongue and its reduced rear end portion and a collar 197 on the rear extremity thereof.

At its forward end the tongue 196 has a clevis 199 fixed thereto and loosely embracing the rear end portion of the drawbar 22, to which it is pivotally connected by means of a pin 200 passing vertically through the arms of the clevis and the end of the drawbar therebetween. The pin 200 thus connects the trailing mowers with the rear of the tractor and provides for swinging of these mowers in unison about the vertical axis of the pin.

With the trailing mowers disposed in transversely spaced relation each offset outwardly with respect to the adjacent rear wheel, the trailing mowers cooperate with the mowing element which is tractively coupled to the front axle of the tractor to cut a swath much wider than when only the forward mowing element is coupled to the tractor.

The drawbar 22, of course, makes it possible to pull any other type of trailing accessory by the tractor. Examples of such accessories are garden sulkies, lawn rollers, seeders, fertilizers and aerators.

Figure 14:
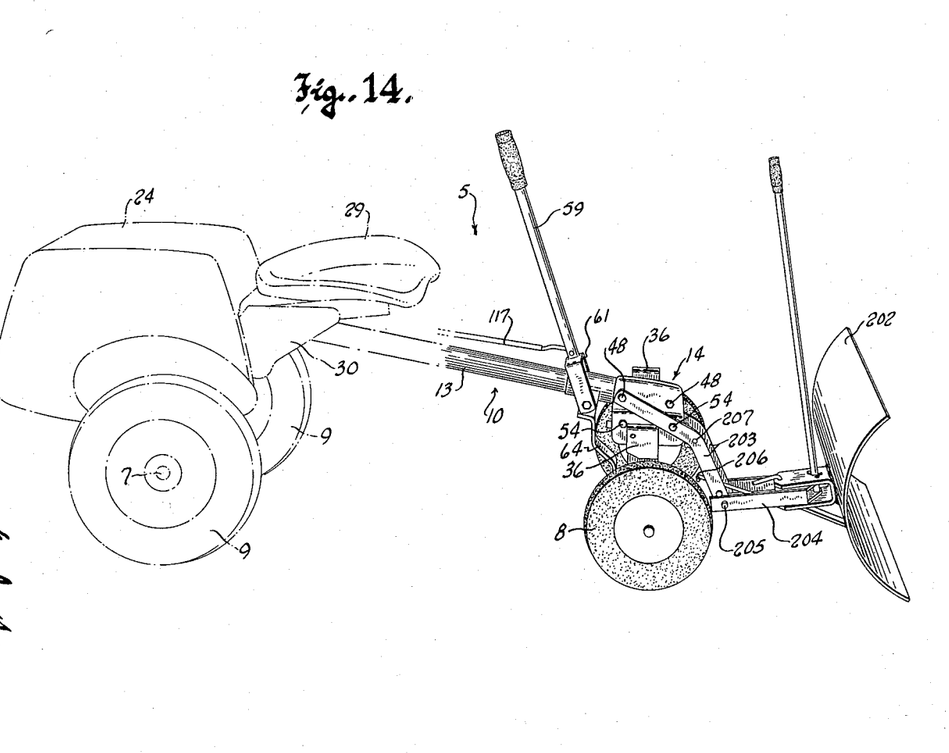
Figure 14 is a perspective view illustrating the manner in which a snow plow blade may be attached to the front of the tractor.

Figure 14 shows how the tractor may be quickly converted to a snow plow by the attachment of a plow blade 202 to the front of the tractor, ahead of the front axle. This is effected by bracket means including spaced opposite arms 203, which embrace and are secured to the swivel head by two of the bolts thereon. These arms extend downwardly and forwardly approximately to the level of the front axle, to have the rear end portion of a bracket 204 hingedly connected thereto by a transverse pin 205. The bracket 204, of course, is carried by the blade 202, at the back thereof. The blade, therefore, can swing up and down about the hinge pin 205, between the operative position shown, and an elevated transit position spaced from the ground, in which it may be held by a hook 206 on the bracket 204 when the hook is engaged in a hole 207 in one of the fixed arms 203 on the swivel head.

From the foregoing description taken together with the accompanying drawings, it will be readily apparent to those skilled in the art that this invention provides a lawn cutting device of exceptional compactness and utility, and which is ideally suited for mowing larger than average lawn; and which device features a short wheel base, light weight, tractor constructed to lengthwise straddle a lawn mowing element and have the same tractively coupled to its front axle.

What is claimed as our invention is:

1. A power driven lawn cutting device comprising the combination of a rotary lawn mower unit having a cutting element which rotates on an upright axis, and a power driven tractor having a chassis straddling the rotary lawn mower unit and to which the mower unit is tractively coupled, said chassis including a transverse front axle having wheels at its opposite ends and located ahead of the axis of rotation of the mower cutting element, said lawn cutting device being characterized by: means on the chassis mounting the front axle for rocking motion about an axis intermediate its wheels and extending longitudinally of the tractor; ground engaging mower supporting means on the rotary lawn mower unit; cooperating means on the mower unit and the chassis pivotally supporting the mower unit for up and down motion relative to the chassis about a transverse axis spaced from said ground engaging mower supporting means in a direction longitudinally of the tractor so that the mower unit may swing up and down with respect to the chassis in consequence of travel of the device over uneven ground; and means interconnecting the mower unit and the front axle to constrain the mower unit to tilt sidewise in correspondence with rocking of the front axle about said longitudinal axis as its wheels ride over uneven ground, whereby said wheels serve as gages to maintain the cutting element of the mower unit in proper relation to the ground during operation of the device.

2. The power driven lawn cutting device of claim 1, wherein said ground engaging mower supporting means is on the rear end portion of the rotary mower unit.

3. The power driven lawn cutting device of claim 1 wherein the power plant of the tractor is mounted on the rear of the chassis and includes a rotatable driving member, and further characterized by the provision of: a rotatable driven member on the lawn mowing unit constrained to rotate with the cutting element thereof; a second driven member carried by the chassis rearwardly of said first driven member; means for drivingly connecting said second driven member with the driving member; and means to drivingly connect said driven members with each other, said means being effective to transmit torque regardless of and without interfering with permitted relative motion between the mower unit and the chassis.

4. A power driven lawn cutting device comprising the combination of a rotary lawn mower unit having a cutting element which rotates on an upright axis, and a power driven tractor having a chassis to which the mower unit is tractively coupled, said chassis including a frame straddling the rotary lawn mower unit, a pair of transversely spaced rear wheels, and a pair of transversely spaced front wheels located ahead of the axis of rotation of the mower cutting element, said lawn cutting device being characterized by: means on the chassis providing for up and down motion of the front wheels with respect to the rear wheels and to one another; ground engaging mower supporting means on the rotary lawn mower unit; cooperating means on the mower unit and the chassis pivotally supporting the mower unit for up and down motion relative to the chassis about a transverse axis spaced from said ground engaging mower supporting means in a direction longitudinally of the tractor, so that the mower unit may swing up and down with respect to the chassis frame in consequence of travel of the device over uneven ground; and means interconnecting the mower unit with the front wheels to constrain the mower unit to tilt sidewise in correspondence with up and down movement of each front wheel relative to the other and to the rear wheels as said front wheels travel over uneven ground, whereby said front wheels serve as gages to maintain the cutting element of the mower unit in proper relation to the ground during operation of the device.

5. In a lawn cutting device, the combination of: a rotary lawn mower unit having a cutting element which rotates on an upright axis; a power driven tractor having a chassis straddling the mower unit and carrying a prime mover for driving the tractor and the cutting element of the mower unit, said chassis including longitudinal frame means straddling the mower unit, a wheel supported rear axle upon which the rear of the frame means is supported, and an elongated transversely extending front axle supporting the front of the frame means and having steerable wheels at its opposite end portions; means connecting the midportion of the front axle with the frame means to provide for rocking motion of the front axle about a longitudinal axis; ground engaging mower supporting means on the rear portion of the mower unit; and means pivotally supporting and tractively connecting the mower unit with the front axle with the front of the mower unit closely therebehind, said last named means providing for up and down pivotal motion of the mower unit relative to the chassis about a transverse axis adjacent to the front of the mower so that the mower unit may swing up and down with respect to the front axle and the frame means of the chassis in consequence of travel of the device over uneven ground but precluding all other motion of the mower unit relative to the front axle so that the mower unit is constrained to rock with the front axle as the front wheels ride over uneven ground, whereby said front wheels serve as gage devices to maintain the cutting element of the mower unit in proper relation to the ground during operation of the device.

6. The lawn cutting device set forth in claim 5, wherein the means which tractively connects the mower unit with the front axle comprises upstanding brackets fixed to the opposite end portions of the axle; and further characterized by the provision of steering knuckles carried by said brackets and having the steerable front wheels journaled thereon.

References Cited in the file of this patent

UNITED STATES PATENTS

| | | |
|---|---|---|
| 729,010 | Synnestvedt | May 26, 1903 |
| 894,060 | Ruemelin | July 21, 1908 |
| 2,283,269 | Krenzke | May 19, 1942 |
| 2,475,671 | McCartney | July 12, 1949 |
| 2,509,993 | Soss | May 30, 1950 |
| 2,580,481 | Strehlow | Jan. 1, 1952 |
| 2,711,624 | Crump | June 28, 1955 |
| 2,723,518 | Carlson | Nov. 15, 1955 |
| 2,763,977 | Spencer et al. | Sept. 25, 1956 |
| 2,765,861 | Ekas | Oct. 9, 1956 |